(12) United States Patent (10) Patent No.: US 8,745,951 B2
Bowers et al. (45) Date of Patent: *Jun. 10, 2014

(54) INTERLOCKING FLANGE AND FASTENING SYSTEM AND METHOD FOR SECURING TOGETHER TWO PANELS

(71) Applicants: Ned C. Bowers, Mount Dora, FL (US); Russell Ortner, Apopka, FL (US)

(72) Inventors: Ned C. Bowers, Mount Dora, FL (US); Russell Ortner, Apopka, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/927,717

(22) Filed: Jun. 26, 2013

(65) Prior Publication Data

US 2013/0287487 A1 Oct. 31, 2013

Related U.S. Application Data

(63) Continuation of application No. 13/435,451, filed on Mar. 30, 2012, now Pat. No. 8,490,358.

(60) Provisional application No. 61/469,961, filed on Mar. 31, 2011.

(51) Int. Cl.
*E04B 2/00* (2006.01)
(52) U.S. Cl.
USPC ........... 52/582.1; 52/747.1; 296/191; 296/29; 403/408.1
(58) Field of Classification Search
USPC ............... 52/582.1, 584.1, 747.1; 296/29, 30, 296/129; 403/408.1
See application file for complete search history.

(56) References Cited

U.S. PATENT DOCUMENTS

| | | | |
|---|---|---|---|
| 2,178,998 A | 11/1939 | Scott | |
| 2,891,757 A * | 6/1959 | Lang | 248/225.11 |
| 5,716,180 A | 2/1998 | Bowers | |
| 5,795,122 A | 8/1998 | Bowers | |
| 6,138,425 A * | 10/2000 | Wendt | 52/506.07 |
| 6,497,451 B1 | 12/2002 | Jones et al. | |
| 7,784,755 B1 * | 8/2010 | Johnson et al. | 248/220.21 |
| 7,997,843 B2 | 8/2011 | Bowers et al. | |
| 2006/0112659 A1 | 6/2006 | Lindner et al. | |
| 2010/0199594 A1 | 8/2010 | Wendt | |

* cited by examiner

*Primary Examiner* — Brian Glessner
*Assistant Examiner* — Brian D Mattei
(74) *Attorney, Agent, or Firm* — Robert L. Wolter, Esq.; Beusse Wolter Sanks Mora & Maire, P.A.

(57) ABSTRACT

A flange component used to secure a first panel to a second panel including a first section to be affixed to the first panel and a second section to be affixed to the second panel. The second section is integrally formed with the first section, which has a length dimension that is longer than a length dimension of the second section forming first and second tabs. The second section of the flange component is integral to an intermediate section between the first and second tabs. The second tab is offset relative to the intermediate section and first tab whereby when the first section is attached to the first panel, a space is formed between the second tab and the first panel. A first tab of an adjacent flange component is inserted this space, and the second section protrudes from a periphery of the first panel for receiving the second panel.

11 Claims, 6 Drawing Sheets

INTERLOCKING FLANGE AND FASTENING SYSTEM AND METHOD FOR SECURING TOGETHER TWO PANELS

CROSS-REFERENCE TO RELATED APPLICATIONS

This application is a Continuation of U.S. application Ser. No. 13/435,451 filed Mar. 30, 2012, which claims the benefit of U.S. Provisional Application No. 61/469,961 filed Mar. 31, 2011, and incorporated herein by reference in their entirety.

BACKGROUND OF THE INVENTION

The subject invention relates generally to fastening systems, methods and/or fasteners that are used to fasten or secure together two panels. More specifically, the subject invention relates to such systems and methods used to secure together two panels, such as panels of a cowling, for aircraft and/or automobiles.

Fasteners, such as those disclosed in U.S. Pat. Nos. 5,795,122 and 5,716,180, and 7,997,843, and manufactured by SKYBOLT® located in Leesburg, Fla., are used to secure together two panels. Such fasteners generally include a receptacle that is mounted to the inner support panel and aligned with a hole in the outer panel or cowling, an optional grommet may be attached to the outer panel, and a stud that is inserted through the grommet (if installed), through both panels and into the receptacle in which it is locked in position. These fasteners are commonly referred to as "quarter turn" panel fasteners or blind threaded fasteners. Typically, these fasteners are used to secure two panels together that may overlap one another and have an integral flange component for securing the two panels together.

However, a number of panels, used for example on aircrafts and racing vehicles or industrial applications, are designed to abut one another, and do not include adequate inner support flanges for supporting the receptacles for quarter turn fasteners or threaded blind fasteners. Accordingly, a flange must be fabricated to fit the panels. Fabrication of such a flange can be extremely time consuming especially when the panels have bends or curves. After a flange or a series of flange sections is fabricated to fit a panel, holes must be drilled in the flanges to accept the fastener receptacle. The spacing of receptacles, and consequently the holes in the panels, is dependant on obstacles such as engine mounts or accessories. Locating or properly positioning the holes and drilling the holes are arduous processes.

Accordingly, a need exists for a part that can be used to adapt one or more panels to include a flange to secure the two panels together without having to essentially fabricate the flange on site.

BRIEF DESCRIPTION OF THE INVENTION

An embodiment of the invention includes a flange component for securing together two panels wherein a plurality of the flange components are used in conjunction with a plurality of fasteners. The flange component may include a first section having an intermediate section disposed between and integrally connected to a first tab and a second tab, wherein the first section has a first length dimension and is capable of being affixed to a first panel. The flange component also includes a second section integrally connected with the intermediate section of the first section and having a second length dimension that is less than the first length dimension. In a preferred embodiment, the second section includes at least one aperture for receiving a fastener that is capable of affixing the second section to the second panel. In addition, on a first side of the component the intermediate section, first tab and second section of the flange component form a coextensive first surface, and the second tab forms a second surface that is offset relative to the first surface.

In this manner, when the flange component is attached to a panel with a first side of the flange component facing the panel, a space is formed between the second tab and the panel. When a plurality of the flange components are aligned side by side or end to end for attachment to the first panel, a first tab on a flange component is inserted in the space between the second tab and second panel, the second section protrudes beyond a periphery of the first panel for receiving the fastener and second panel.

In an embodiment in which quarter-turn fasteners or threaded blind fasteners, or any other fastener including a receptacle attached to the second section at the aperture, holes are formed in the second panel for alignment with the apertures and receptacle. If the panels are used to cover a part or object that has obstacles, it may be necessary to avoid certain obstacles. In such a case, the first tab may be trimmed to shorten the distance between two adjacent receptacles and avoid an obstacle.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be describe and explained with additional specificity and detail through the use of the accompanying drawings.

FIG. 7 is an elevational view of the flange component with a tab trimmed as may be necessary for installation.

DETAILED DESCRIPTION OF THE INVENTION

Figure 1:
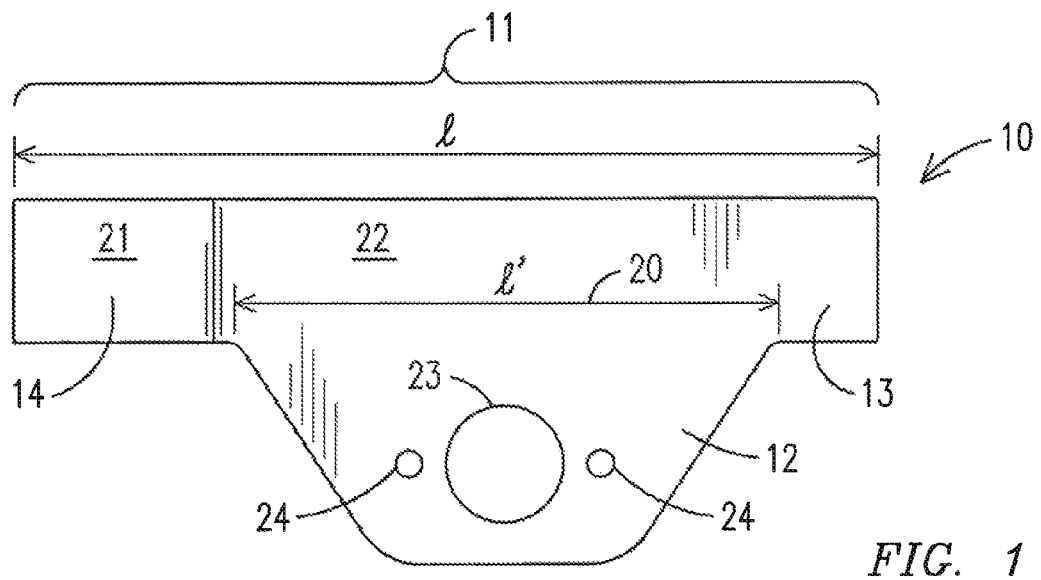
FIG. 1 is an elevational view of a face or side of the flange component.

Reference will now be made in detail to the embodiments consistent with the invention, examples of which are illustrated in the accompanying drawings. Wherever possible, the same reference numerals are used throughout the drawings and refer to the same or like parts.

The present invention may be used in the assembly of a part that includes at least two panels secured in fixed relation to one another, wherein the panels have elongated edges that require multiple fasteners spaced apart along a respective edge of one or both of the panels. Accordingly, in an embodiment of the subject invention multiple flange components are used to form a flange assembly to support the fasteners and secure the panels together. The term panel as used herein may include a panel including a single panel section or multiple panel sections secured together to form a single panel.

Figure 2:
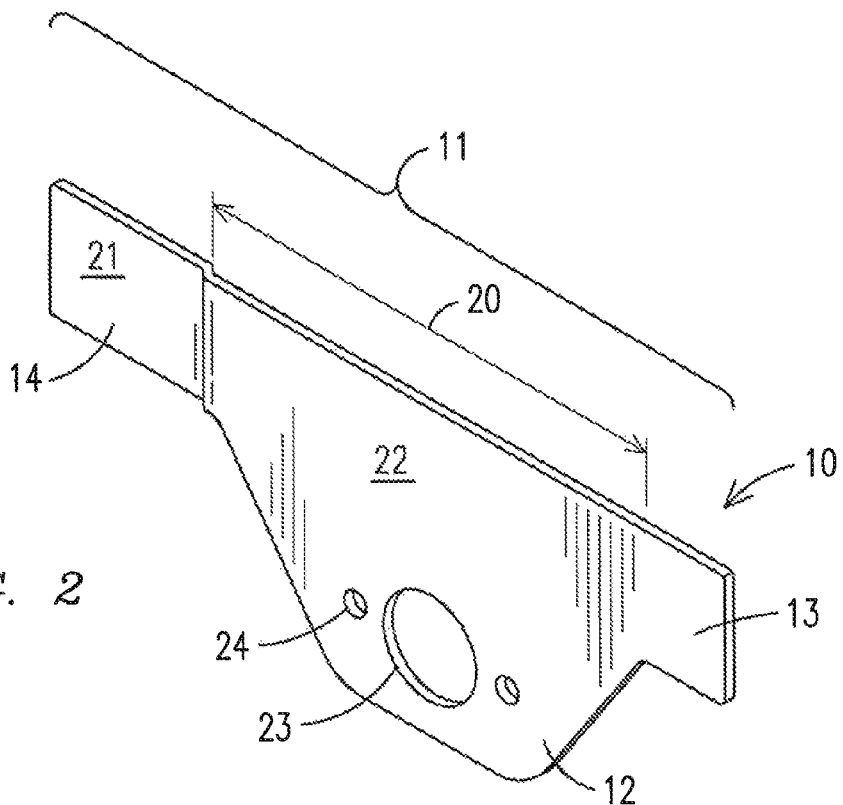
FIG. 2 is a perspective view of the flange component.
Figure 3:
FIG. 3 is an elevational view of a side edge of an inventive flange component.
Figure 4:
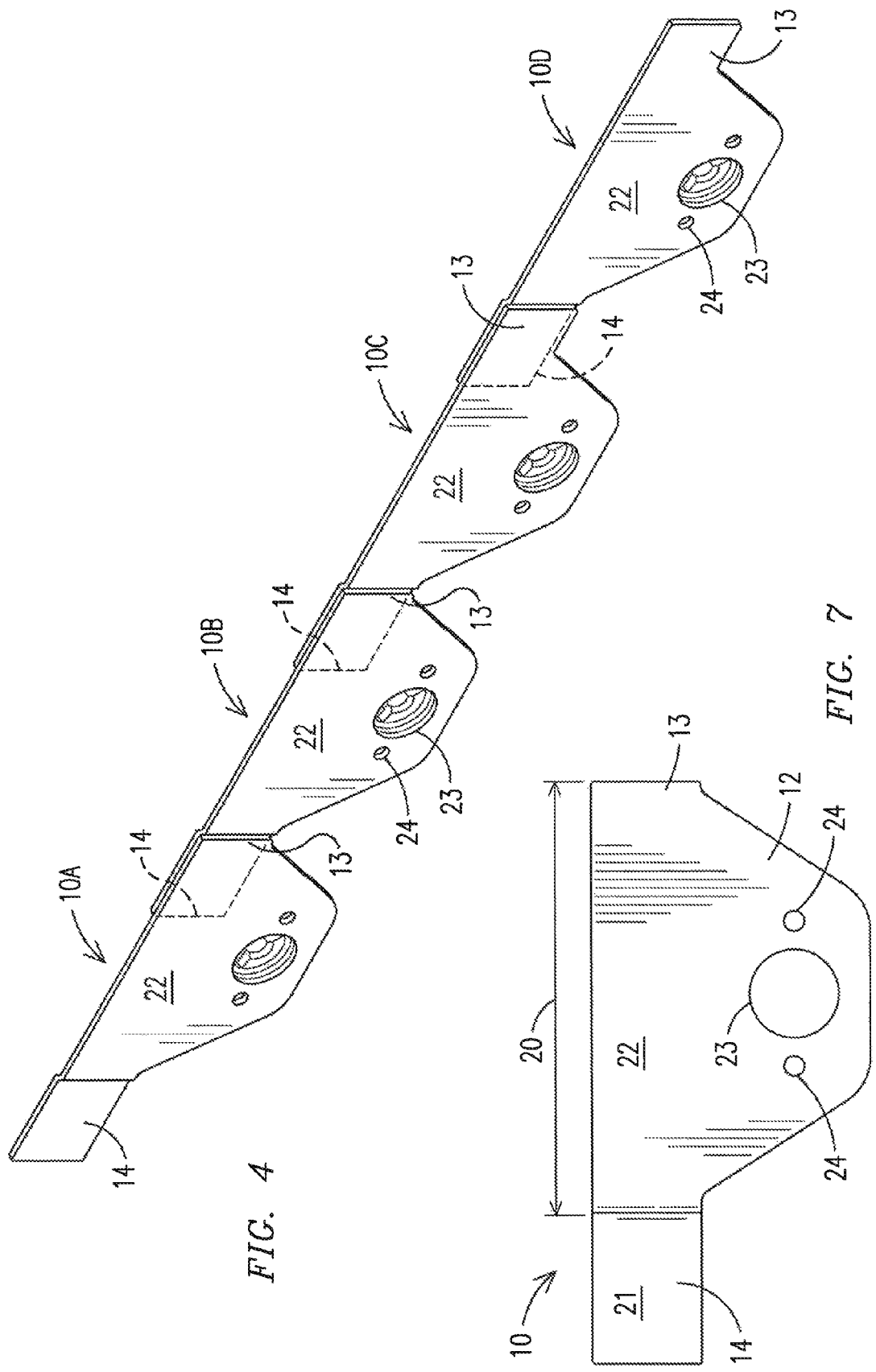
FIG. 4 is a perspective view of a plurality of the flange components shown aligned side by side and having fastener receptacles installed thereon.
Figure 5:
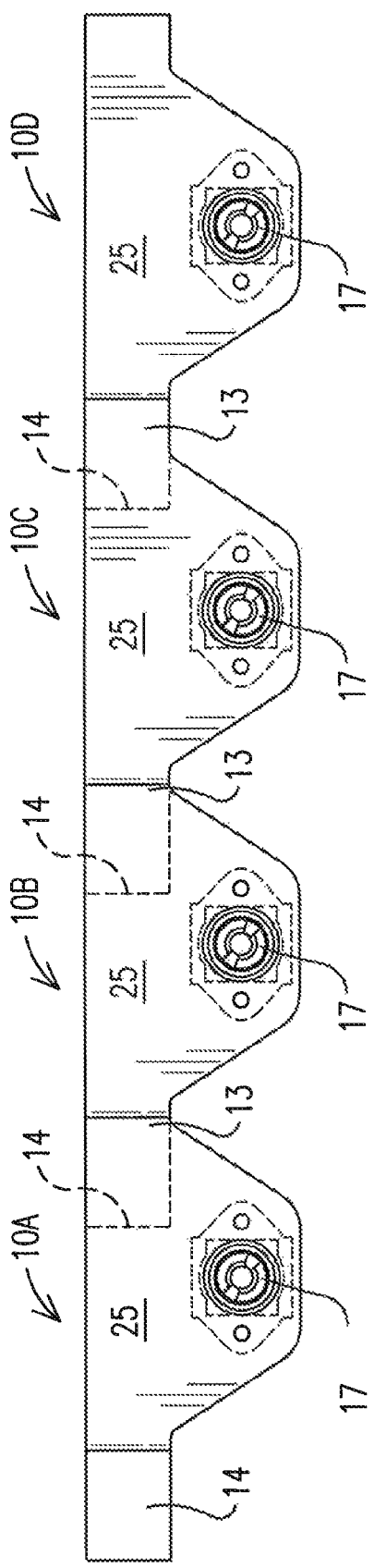
FIG. 5 is an elevational view of the face or side of the plurality of the flange components of FIG. 4.

With respect to FIG. 1-3, a flange component 10 is illustrated including a first section 11 and a second section 12. The first section 11 is intended to be affixed to a first panel 15 (shown in FIG. 8-10) and the second section 12 is intended to be affixed to a second panel 26 (also shown in FIGS. 8-10). The second section 12 is configured to receive a fastener 16 that includes a receptacle 17, grommet 18 and stud 19. More specifically, an aperture 23 is formed in the second section 12 for receiving a fastener 6. Examples of fasteners that may be used in conjunction with a plurality of the flange components 10 are described in U.S. Pat. Nos. 5,795,122, 5,716,180, and 7,997,843, the specifications of which are incorporated herein by reference.

Figure 11:
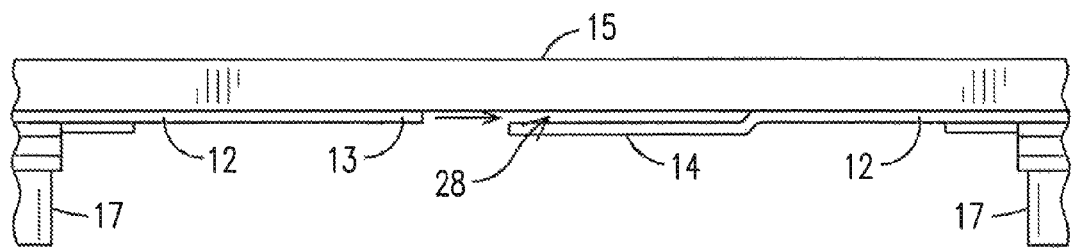
FIG. 11 is an elevational view of an installed first flange component and a second flange component positioned for installation.

The first section 11 of the flange component 10 includes an intermediate section 20 disposed between a first tab 13 and a second tab 14. That is, the first section 11 has a length dimension "l" that is greater than a length dimension "l" of the second section forming the tabs 13 and 14. The second tab 14 is disposed on the flange component 10 relative to the intermediate section 20 or relative to the first panel 15 so that the second tab 14 is spaced from the first panel 15 when the flange component 10 is affixed to the panel 15. More specifically, as shown in FIG. 1, a face or surface 21 of the second tab 14 is offset relative to a face or surface 22 of the component 10 or intermediate section 20. As shown in FIG. 11, when the flange component 10 is affixed to a panel 15, the offset positioning of the second tab 14 establishes a space or gap 28 between the panel 15 and the second tab 14. In this manner, the first tab 13 of an adjacent flange component 10 may be inserted into the space 28.

Figure 6:
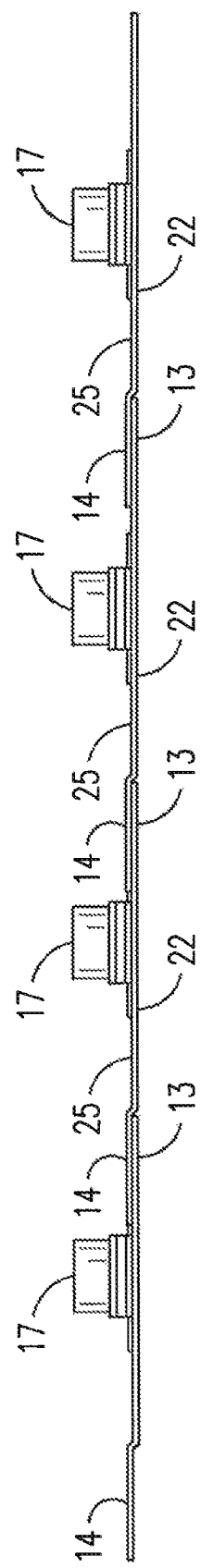
FIG. 6 is an elevational view of the edges of a plurality of the flange components of FIG. 4.

The flange component 10 is preferably fabricated from a metal or metal alloy, such as aluminum or aluminum alloy, using stamping fabrication machines and/or techniques or composite layup techniques. Accordingly, certain sections or parts of the component 10, including the intermediate section, first tabs 13 and second section 12 have substantially the same or equal thickness. In a preferred embodiment, the second tab 14 also has the same thickness. For example, for a flange component used to install engine cowlings for aircraft and racing vehicles or industrial panels, the thickness of the component 10 may be about 0.05 inches. Thus, the offset or distance the second surface 21 is offset relative to the first surface 22 or the panel 15 is generally equal to the thickness of the component 10. By dimensioning the component 10 in this manner, the end to end alignment of the flange components 10A-10D, as shown in FIG. 6, forms a substantially flush or continuous surface against a panel. In addition, the second tab 14 preferably has a length dimension such that when the first tab 13 is inserted in the space 28, the second tab 14 covers the first tab 13 and a portion of the intermediate section 23; or, if the first tab 13 is trimmed as described below, the second tab 13 will cover a portion of the intermediate section 22.

With respect to FIGS. 2 and 3, and as described above, the flange component 10 includes a second section 12 integrally formed with the first section 11. The second section 12 includes one or more apertures for attachment of the fastener 16 to the flange component 10 and the second panel 26, thereby securing a second panel 26 to the first panel 15. In the embodiment shown, FIGS. 1, 6 and 9, the second section 12 includes a first aperture 23 and two second apertures 24. The receptacle 17 of the fastener 16 is generally aligned (preferably concentrically aligned) with the first aperture 23 when the receptacle 17 is mounted to a second (or back) surface 25 of the flange component 10 or second section 12 of the flange component 10. The second apertures 24 may receive rivets for securing the receptacle 17 to the flange component 10. In this manner, and as further shown in FIG. 10, the grommet 18 is disposed within a hole on the second panel 26 and the aperture 23 of the second section 12, and the stud 19 is inserted through the grommet 18 and into receptacle 17 and locked in position in a manner as set forth in the above cited '122 and '180 patents to secure the second panel to the flange component 10 and the first panel 15 and second panel 26. As indicated above, some fasteners do not require grommets, so the use of a grommet is optional.

As shown in FIGS. 1 and 4-6, the length "l" of the first section 11, including the first and second tabs 13, 14 and intermediate section 20, is such that a center of the first aperture 23 and receptacle 17 are spaced apart a predetermined distance. By way of example, the predetermined distance may be about 3.50 inches. However, during installation of the flange components 10, fasteners 16 and panels, it may be necessary to adjust the position of a fastener 16 relative to an adjacent fastener. With respect to a cowling for an aircraft that covers engine components, it may be necessary to adjust the relative position of the fasteners 16 to avoid engine component parts. Accordingly, the first tab 13 may be trimmed to adjust the distance between respective receptacles 17 or fasteners 16 as shown in FIG. 7. Again with respect to FIG. 4-6, the length of the first tabs 13 on a first and second flange components 10A and 10B have been adjusted (or shortened) so that the distance between respective fastener receptacles 17 may be, for example, 3.00 inches as compared to the distance of respective receptacles 17 mounted to flange components 10C and 10D, which distance is about 3.50 inches.

Figure 8:
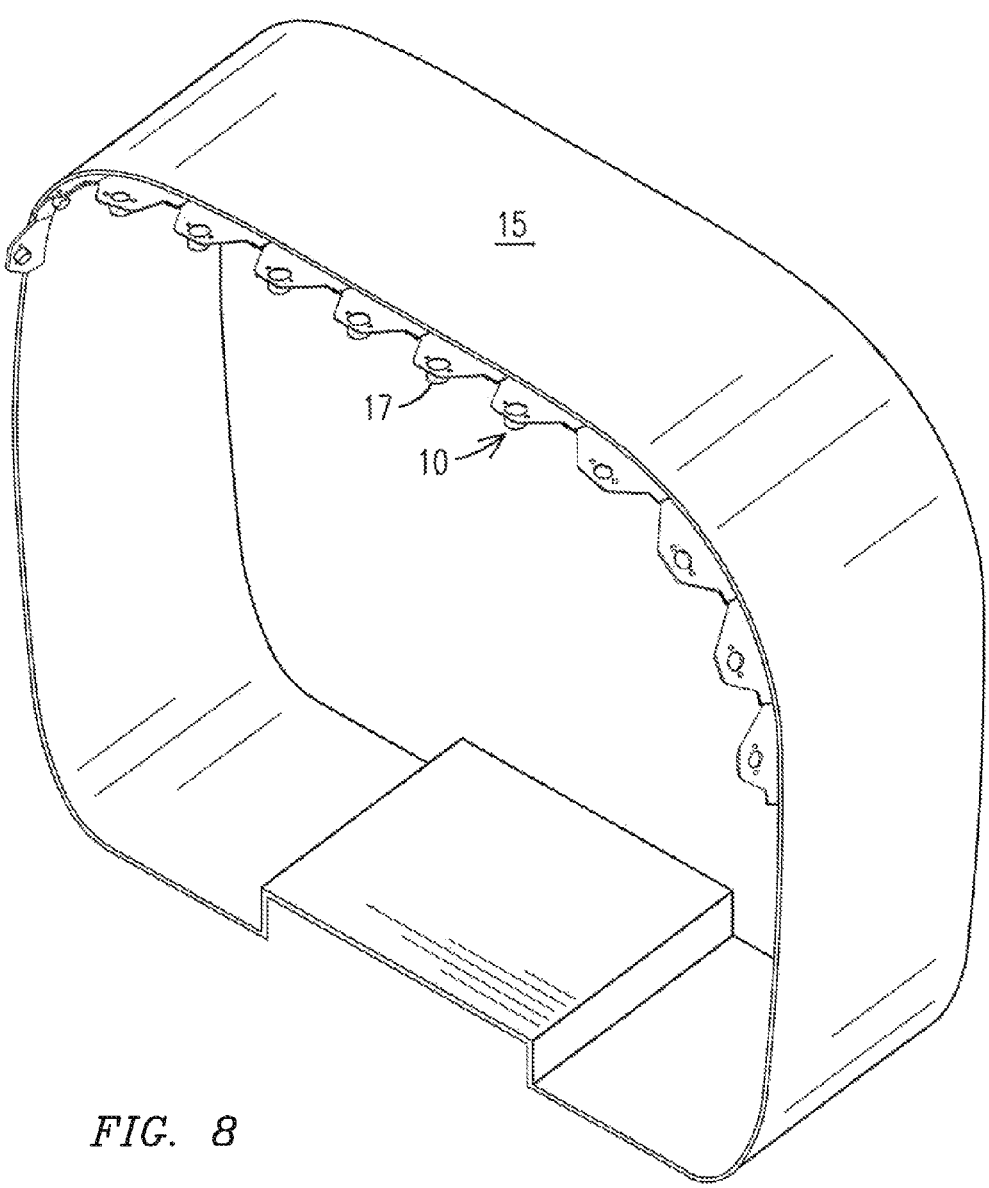
FIG. 8 is a partial perspective view of a plurality of the flange components installed on a first panel.
Figure 9:
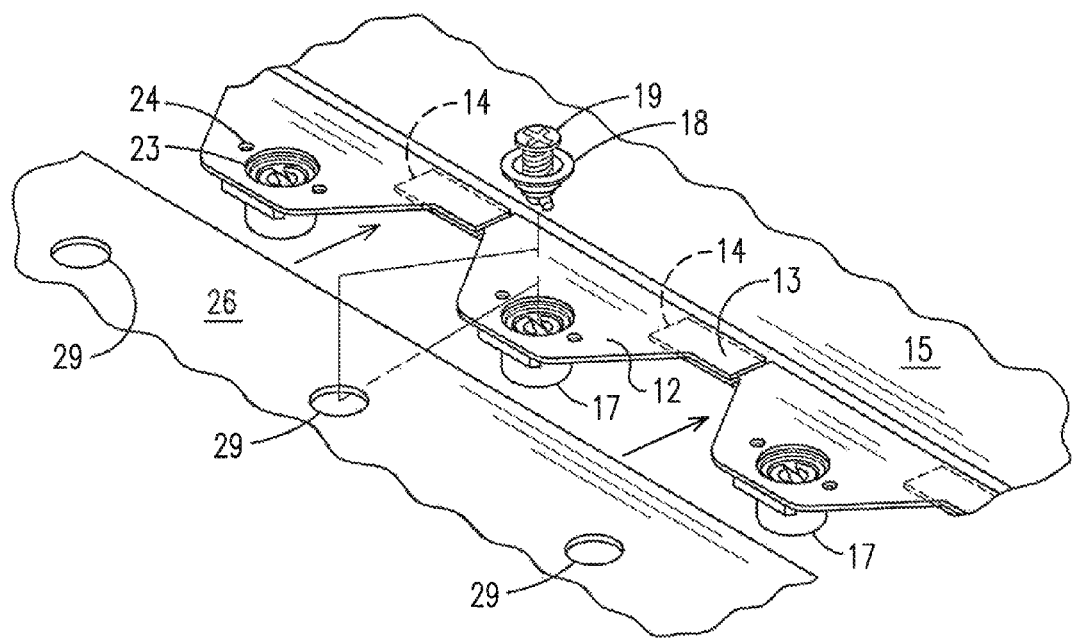
FIG. 9 is an expanded perspective view of the flange components installed on the first panel illustrated in FIG. 8.
Figure 10:
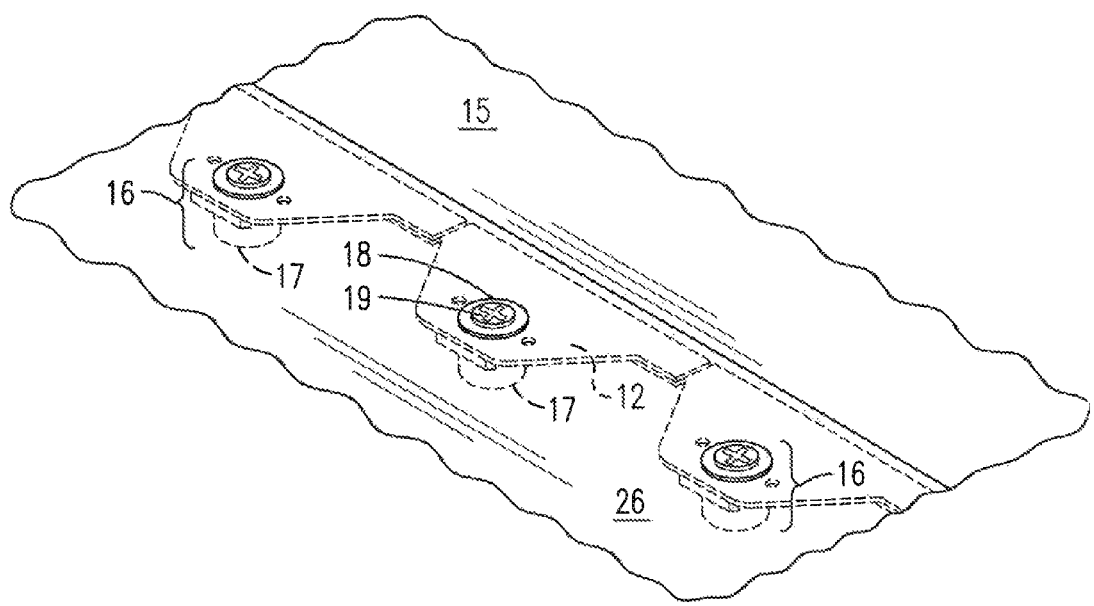
FIG. 10 is a partial perspective of a second panel having been affixed to the flange components of FIG. 8.
Figure 12:
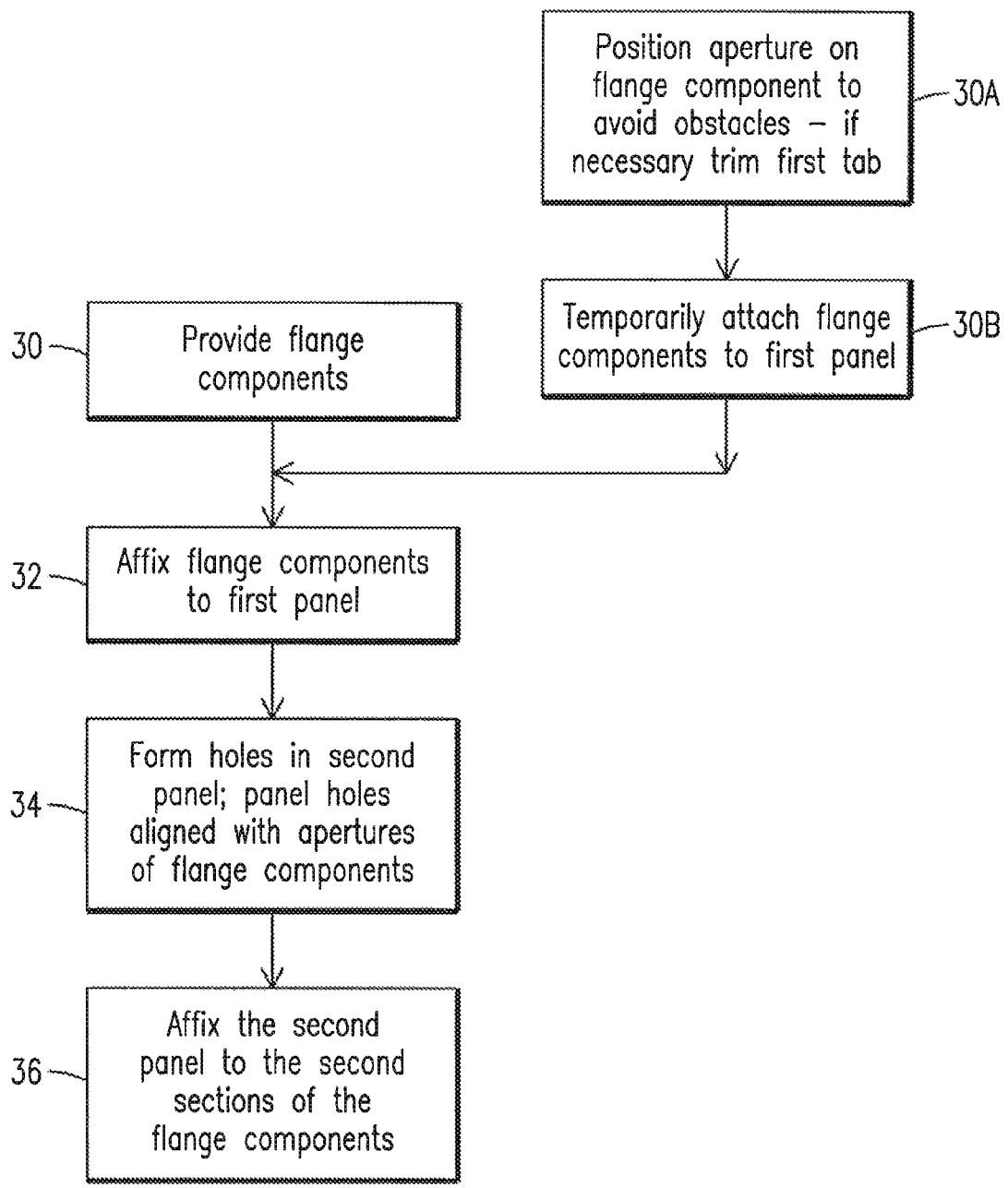
FIG. 12 is a flowchart including steps in a method of securing together two panels using the flange components described herein.

In a method of securing a first panel to a second panel as outlined in the flow chart of FIG. 12, a plurality of the above-described flange components 10 are provided with a plurality of fasteners. (Step 30.) At step 32 the flange components are affixed to a first panel wherein the first section 11 of each flange component 10 is affixed to a first panel such that the second section 12 of each flange section protrudes from a periphery 28 and is positioned to receive the second panel 26, as illustrated in FIGS. 8 and 9.

As noted above, obstacles such as engine mounts or engine components may be present and the aperture 23 on the second section 12 of a flange component 10 must be positioned relative to such obstacles so the receptacle 17 of the fastener 16 can attached to the flange component 10. Accordingly, the method may include step 30A which includes positioning the aperture 23 to avoid such obstacles, and if necessary trimming the first tab 13 to appropriately position the aperture 23. To that end, at step 30B the flange components 10 are preferably temporarily attached to the first panel 15 so that all the flange components 10 are adequately positioned relative to one another and to existing obstacles before more permanently affixing the flange components 10 to the first panel 15. Rivets, driven through the panel 15 and first sections 12 of respective flange components may be used to affix the flange components 10 to the first panel 15.

At step 34, holes 29 are formed in the second panel, which holes are positioned for alignment with the aperture 23 on respective flange components 10 on the first panel 15, Formation of the holes 29 may be performed by first marking the location for each hole 29 that is to receive a grommet 18 (if needed) and stud 19. Then at step 36, the second panel 26 is affixed to the second section 12 of each of the flange components 10 by inserting the stud 19 into the receptacle 17, and turning it to a locked position, thereby securing the second panel 26 in abutting relationship with the first panel 15. The step of affixing the second panel 26 includes positioning the second panel 26 relative to the first panel 15, so that each hole 29 is aligned with a corresponding aperture 23.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

The invention claimed is:

1. A flange component for securing together two panels wherein a plurality of the flange components are used in conjunction with a plurality of fasteners, each fastener being secured to a respective flange component and one of the panels to secure a first panel to a second panel, the flange component comprising:
   a first section including an intermediate section disposed between and integrally connected to a first tab and a second tab, wherein the first section has a first length dimension and is capable of being affixed to the first panel, and wherein the first section includes a free edge extending from a first free end of the first tab to a second free end of the second tab, wherein a surface of the free edge along the first tab, the second tab and the intermediate section is coplanar with a plane extending orthogonal to a surface of the first section;
   a second section integrally connected with the intermediate section of the first section and having a second length dimension that is less than the first length dimension and the second section having an aperture for receiving a fastener to secure the second panel to the second section and relative to the first panel;
   wherein the first tab, intermediate section and second section are co-planar and the first tab has a thickness dimension, and the second tab is offset relative to the intermediate section a dimension that is substantially equal to the thickness of the first tab;
   and wherein the first tab and the second tab are spaced apart by the second length dimension.

2. The flange component of claim 1, wherein a first side of the flange component faces the first and second panels when the first section is attached to the first panel and a second side of the flange components faces away from the first and second panels, and the second tab is spaced apart from the first panel and the first tab and/or a portion of the intermediate section of an adjacent flange component is disposed between the second tab and first panel.

3. The flange component of claim 2, wherein the intermediate section and the second section each has a thickness dimension that is substantially equal to the thickness dimension of the first tab.

4. The flange component of claim 1, wherein the first length dimension is set so that the aperture on the second section may be spaced apart a predetermined distance when a flange component is installed on the first panel, and the first tab is capable of being trimmed before installation to shorten the predetermined distance.

5. The flange component of claim 1, wherein the second section is integral to the first section between the first and second tabs, and the second section includes first and second side edges that extend away from the first section and converging toward one another.

6. A flange component for securing together two panels wherein a plurality of the flange components are used in conjunction with a plurality of fasteners, each fastener being secured to a respective flange component and one of the panels to secure a first panel to a second panel, the flange component comprising:
   a first section including an intermediate section disposed between and integrally connected to a first tab and a second tab, wherein the first tab and the second tab have a substantially similar geometrical configuration including a width dimension that is substantially equal and wherein the first section has a first length dimension and is capable of being affixed to the first panel;
   a second section integrally connected with the intermediate section of the first section and having a second length dimension that is less than the first length dimension and the second section having an aperture for receiving a fastener to secure the second panel to the second section and relative to the first panel; and,
   wherein on a first side of the component the intermediate section, first tab and second section of the flange component form a coextensive first surface, and the second tab forms a second surface that is offset relative to the first surface;
   wherein a gap is formed between a panel and the first tab for receiving a second tab of an adjacent flange component when the flange component is attached to a panel with the first side of the flange component facing the panel;
   and wherein the first tab and the second tab are spaced apart by the second length dimension.

7. A flange component for securing together two panels wherein a plurality of the flange components are used in conjunction with a plurality of fasteners, each fastener being secured to a respective flange component and one of the panels to secure a first panel to a second panel, the flange component comprising:
   a first section including an intermediate section disposed between and integrally connected to a first tab and a second tab, wherein the first section has a first length dimension and is capable of being affixed to the first panel, and wherein the first section includes a first free edge extending from a first free end of the first tab to a second free end of the second tab, wherein a portion of the first free edge extending from the first free end through the intermediate section is linear;
   a second section integrally connected with the intermediate section of the first section and having a second length dimension that is less than the first length dimension and the second section having an aperture for receiving a fastener to secure the second panel to the second section and relative to the first panel, wherein the second section includes a second free edge that is aligned substantially parallel with the first free edge;
   wherein the first tab, intermediate section and second section are co-planar and the first tab has a thickness dimension, and the second tab is offset relative to the intermediate section a dimension that is substantially equal to the thickness of the first tab.

8. The flange component of claim 7, further comprising:
the plurality of fasteners;
wherein each fastener is affixed to the second section of a respective flange component to secure the first panel and second panel together, each fastener comprising:
(a) a receptacle attached to a second side of a respective flange component that faces away from the second panel and having an opening concentrically aligned with the aperture on the second section of the flange component; and,
(b) a stud inserted through the panels, into the receptacle and secured in a locked position within the receptacle to affix the second panel and flange component together.

9. The flange component of claim 7, wherein a first side of the flange component faces the first and second panels when the first section is attached to the first panel and a second side of the flange components faces away from the first and second panels, and the second tab is spaced apart from the first panel and the first tab and/or a portion of the intermediate section of an adjacent flange component is disposed between the second tab and first panel.

10. The flange component of claim 9, wherein the intermediate section and the second section each has a thickness dimension that is substantially equal to the thickness dimension of the first tab.

11. The flange component of claim 7, wherein the first length dimension is set so that the aperture on the second section may be spaced apart a predetermined distance when a flange component is installed on the first panel, and the first tab is capable of being trimmed before installation to shorten the predetermined distance.

* * * * *